United States Patent [19]

Green

[11] Patent Number: 5,469,341
[45] Date of Patent: Nov. 21, 1995

[54] LIGHT BAR WITH REFLECTOR ASSEMBLY

[75] Inventor: Timothy M. Green, Fenton, Mo.

[73] Assignee: Public Safety Equipment, Inc., St. Louis, Mo.

[21] Appl. No.: 119,741

[22] Filed: Sep. 10, 1993

[51] Int. Cl.⁶ .................................................. B60Q 1/02
[52] U.S. Cl. ........................ 362/83.3; 362/217; 362/297; 362/346
[58] Field of Search ............................ 362/74, 297, 346, 362/61, 83.3, 217

[56] References Cited

U.S. PATENT DOCUMENTS

| | | | |
|---|---|---|---|
| 3,237,003 | 2/1966 | Tomkinson | 240/1.3 |
| 3,484,597 | 12/1969 | Schmidt | 240/1.3 |
| 4,298,909 | 11/1981 | Krieg | 362/18 |
| 4,300,831 | 11/1981 | Isago | 355/67 |
| 4,317,625 | 3/1982 | Van Allen | 354/145 |
| 4,356,533 | 10/1982 | Takematsu | 362/17 |
| 4,460,942 | 7/1984 | Pizzuti | 362/217 |
| 4,539,628 | 9/1985 | Bartenbach | 362/217 |
| 4,570,203 | 2/1986 | Daniels et al. | 362/16 |
| 4,702,581 | 10/1987 | Yamada et al. | 354/126 |
| 4,754,375 | 6/1988 | Ferenc | 362/74 |
| 4,792,717 | 12/1988 | Ferenc | 313/113 |
| 4,799,136 | 1/1989 | Molnar | 362/300 |
| 4,800,468 | 1/1989 | Yokoyama | 362/61 |
| 4,821,053 | 4/1989 | Dowe et al. | 354/149.1 |
| 4,866,329 | 11/1991 | Ferenc | 313/113 |
| 4,931,768 | 6/1990 | Jincks et al. | 340/473 |
| 4,954,938 | 9/1990 | Lyons | 362/298 |
| 4,985,814 | 1/1991 | Lyons | 362/240 |
| 5,040,103 | 8/1991 | Lyons | 362/268 |

OTHER PUBLICATIONS

Federal Signal Corp., Federal Jet Strobe™ Strobe Light Bar, 3 pages, 1990, University Park, Illinois.

*Primary Examiner*—Ira S. Lazarus
*Assistant Examiner*—Sara Sachie Raab
*Attorney, Agent, or Firm*—Senniger, Powers, Leavitt & Roedel

[57] ABSTRACT

A light reflector assembly, for use with a light bar of standard construction, includes a reflector body having a front reflective surface, a back, and first and second opposite ends. A lamp is mounted on the reflector body forward of the reflective surface. The front reflective surface is concave with respect to an axis disposed forward of the reflective surface and extending in end-to-end direction relative to the reflector body. The reflective surface reflects light emitted by the lamp in a generally forward direction. The light reflector assembly further includes an end piece at the first end of the reflector body. The end piece has a concave reflective surface facing generally toward the second end of the body.

50 Claims, 5 Drawing Sheets

LIGHT BAR WITH REFLECTOR ASSEMBLY

BRIEF SUMMARY OF THE INVENTION

This invention relates generally to light reflectors, and more particularly to a light reflector assembly which is especially suited for use in light bars mounted on emergency vehicles.

Emergency lighting on police or other public service vehicles has been used for many years. Generally, such lighting is mounted on the exterior (usually the roof) of the vehicle in order to provide high visibility to nearby motorists and pedestrians. Exterior mounting also minimizes the possibility that the light produced by the lighting system will adversely affect the vision of someone in the vehicle.

Light bars are generally the most desirable type of emergency exterior lighting because of their ability to provide a wide variety of types of illumination. Typically, the light bar is a rectangular unit which spans the top of the vehicle and is supported by brackets attached to the vehicle. Reflector assemblies may be housed within the light bar for providing the necessary illumination. It is desirable that the light bar produce an intense light for maximum visibility.

Prior light bars have included reflector assemblies of the type having a parabolic reflecting surface capable of directing a relatively intense, focused beam of light in a forward direction relative to the reflector assembly. However, the light emitted laterally (sideways) with respect to the reflector assembly has been relatively unfocused and disperse (i.e., not intense). Thus, to illuminate the sides of a vehicle, additional reflector assemblies mounted in the light bar at the ends thereof and directed towards the sides of the vehicle must be provided in addition to the reflector assemblies mounted within the light bar which are directed for illuminating the front and back of the vehicle. Light bars not having such additional reflector assemblies have "blind spots" where the light emitted from the ends of the light bar is not as intense as the light directed forwardly and rearwardly with respect to the light bar.

Accordingly, there is presently a need for a reflector assembly capable of reflecting the aforementioned unfocused and disperse light and directing that light to the "blind spots" of the light bar.

Among the several objects of this invention may be noted the provision of light reflector assembly capable of directing beams of light emitted therefrom in two general directions; the provision of such an assembly which is especially suited for use in light bars for emergency vehicles and which eliminates blind spots without increasing the number of assemblies in the light bar; the provision of such a reflector assembly which is designed to facilitate the repair and replacement of parts subject to occasional failure, such as capacitors and lamps; the provision of such a reflector assembly capable of stabilizing the wiring associated with the strobe light of the reflector assembly; the provision of such a reflector assembly which is economical to manufacture and which decreases the overall cost of manufacturing a light bar within which the reflector assembly is mounted; and the provision of such a reflector assembly which is easy to assemble.

Generally, this invention is directed to a light bar having an axis and being adapted to be mounted on a vehicle with its axis extending generally in side-to-side direction with respect to the vehicle. The light bar comprises at least one light reflector assembly. The reflector assembly comprises a reflector body having a front reflective surface, a back, and first and second opposite ends. A lamp is mounted on the reflector body forward of the reflective surface. The front reflective surface is concave with respect to an axis disposed forward of the reflective surface and extends in end-to-end direction relative to the reflector body. The reflective surface is adapted to reflect light emitted by the lamp in a generally forward direction generally perpendicular to the axis of the front reflective surface. An end piece is provided at the first end of the reflector body and has a concave reflective surface facing generally toward the second end of the body for reflecting light emitted by the lamp in a direction generally transverse to the light reflected by the front reflective surface so as to be readily visible by a person standing to one side of the vehicle.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
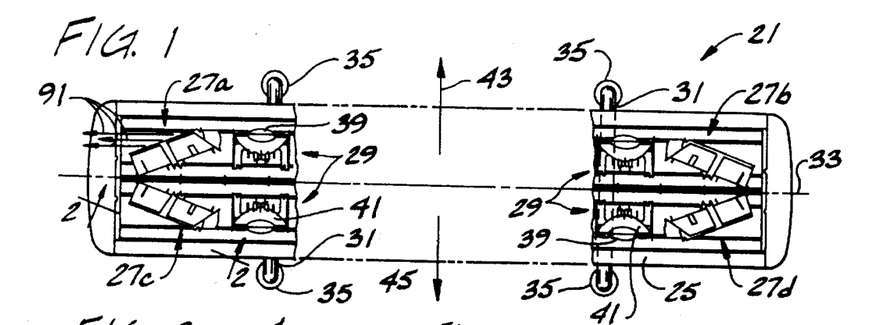
FIG. 1 is a top plan view of a light bar having four reflector assemblies of the present invention.

Referring now to the drawings, and more particularly to FIG. 1, a light bar is generally indicated by the reference numeral 21. As shown in FIG. 1, the light bar 21 includes a rectangular housing having a generally flat, horizontal rectangular base 25 of extruded aluminum, for example, adapted to support four reflector assemblies, each generally indicated at 27, and a plurality of light modules, each generally indicated at 29. As shown, one reflector assembly 27 is positioned at each corner of the light bar 21, and the light modules 29 are positioned between laterally opposite reflector assemblies. A pair of legs, each designated 31, on the bottom of the base 25 support the light bar 21 on the roof of an emergency vehicle (not shown), preferably with the central longitudinal axis 33 of the light bar extending in side-to-side direction with respect to the vehicle. Each leg 31 includes two, spaced-apart feet 35 which are secured to the roof to mount the light bar 21 in position.

The light modules 29 are mounted generally parallel to the longitudinal axis 33 of the light bar to emit light generally forward and rearward with respect to the vehicle. Each module 29 has a strobe lamp 39 for emitting light and a parabolic reflective surface 41 for reflecting and intensifying the light in a direction generally perpendicular to axis 33. Among other things, the modules 29 are provided for alerting drivers of vehicles behind and in front of the emergency vehicle. It is to be understood that any number of modules 29 may be provided on the light bar 21 and that other illumination devices, such as incandescent lamps, may be used instead of strobe lamps 39.

As illustrated in FIG. 1 and described above, light bar 21 has four reflector assemblies 27a–d, one reflector assembly mounted at each corner of the light bar. As with the modules 29, any number of reflector assemblies 27 may be provided. Arrow 43 indicates the forward side of the light bar 21 having the forward end of the vehicle and arrow 45 indicates the rearward side of the light bar. The forward end of the vehicle is illuminated by two reflector assemblies 27a, 27b. One assembly 27a is mounted in the light bar 21 adjacent the upper left-hand corner of the light bar (as viewed in FIG. 1) at an angle of approximately 20° relative to the longitudinal axis 33, so that light emitted from the reflector assembly 27a is directed generally forwardly and to the left with respect to the vehicle (at an angle of approximately 20° with respect to arrow 43). Likewise, the other reflector assembly 27b illuminating the forward end of the vehicle is mounted in the light bar 21 adjacent the upper right-hand corner thereof (as viewed in FIG. 1). Light emitted from this assembly 27b is directed generally forwardly and to the right with respect to the vehicle. The reflector assemblies 27c, 27d illuminating the rear of the vehicle are similarly mounted in the light bar 21.

Referring generally to FIGS. 2–11, the construction of the reflector assemblies 27 will now be described. Since each reflector assembly is of identical construction, a description of one will suffice for all. Reflector assembly 27 comprises a reflector body 51 having a front reflective (mirror) surface 53 for reflecting light generated by a lamp 55, the lamp being mounted on the reflector body forward of the reflective surface. The reflector body 51 further includes a back 57, and first and second opposite ends, designated 59 and 61, respectively. The reflector body 51 is concave with respect to a horizontal axis 63 (see FIGS. 4 and 5) which is disposed forward of the reflective surface 53 and extends in end-to-end direction relative to the reflector body 51. The lamp 55 is mounted to extend along this axis 63.

Figure 4:
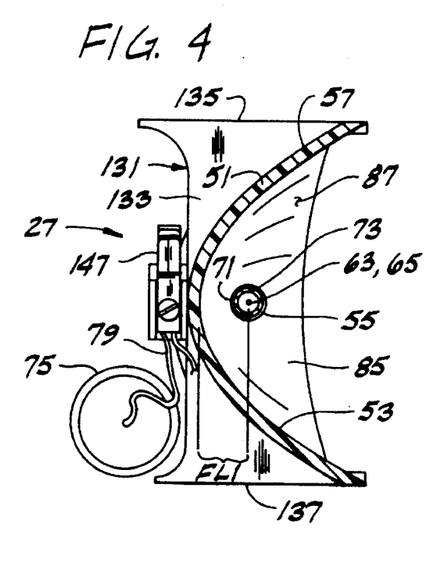
FIG. 4 is a vertical section taken on line 4—4 of FIG. 2.

More specifically, the reflective surface 53 of the reflector body 51 is generally parabolic (as best illustrated in FIG. 4), and it extends continuously along the entire length of the reflector body 51 such that the focal point of any cross section taken along the length of the body has a constant focal length FL1 (e.g., 0.4 inches). This constant focal length defines a focal line 65 of the reflective surface 53. The focal line 65 is coaxial with the axis 63 (and lamp 55) for intensifying the light emitted by the lamp reflected off the reflective surface, as is well known in the art. Thus, light emitted by the lamp 55 is reflected off the reflective surface 53 and directed as a relatively concentrated beam in a generally forward direction with respect to the reflector body 51.

Figure 2:
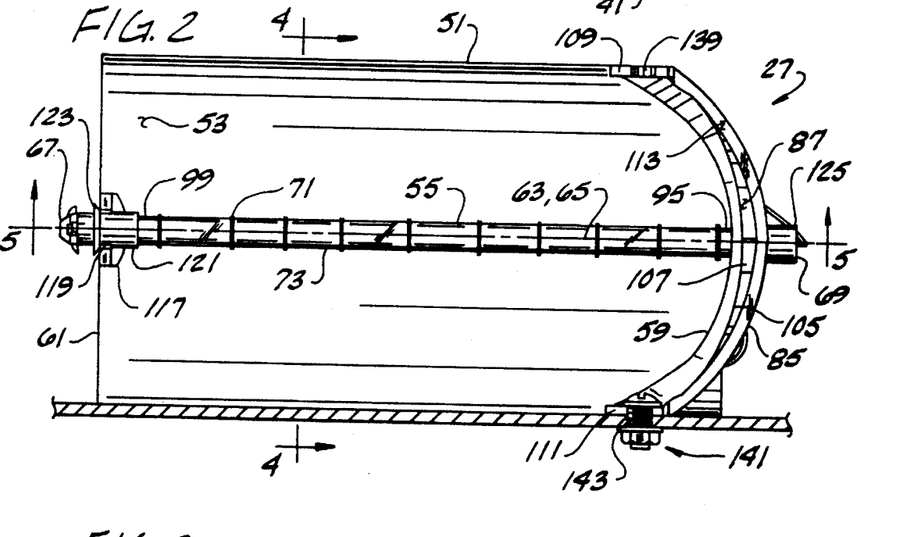
FIG. 2 is an enlarged front elevational view of a reflector assembly taken on line 2—2 of FIG. 1.
Figure 3:
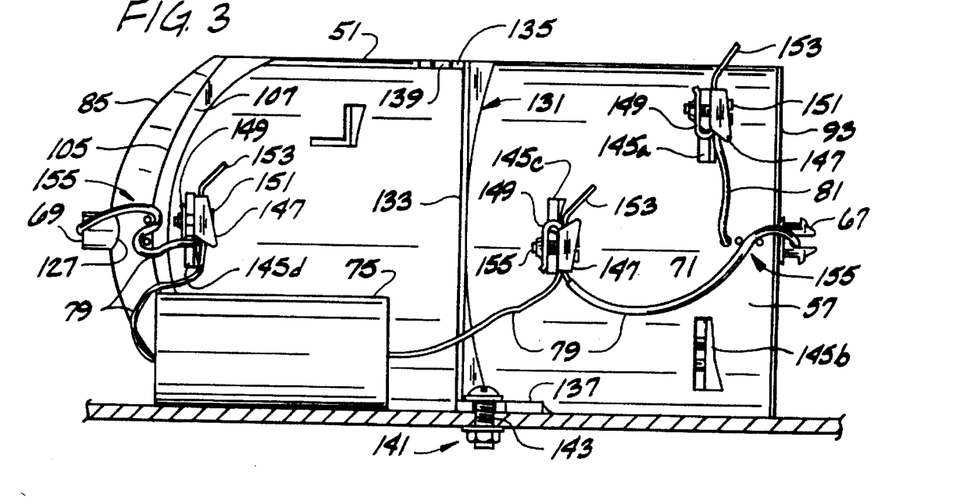
FIG. 3 is a rear elevational view of the reflector assembly shown in FIG. 2.
Figure 10:
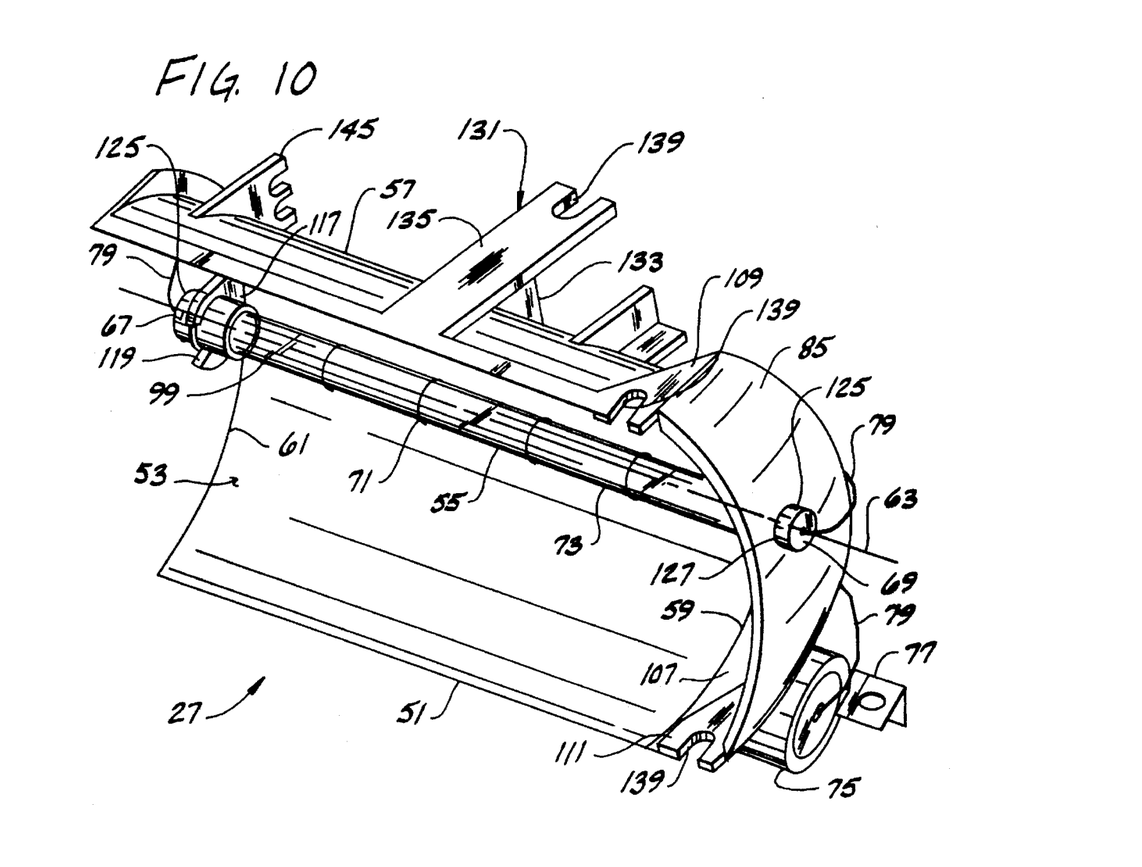
FIG. 10 is a perspective of the reflector assembly.

As illustrated in FIGS. 2 and 3, the lamp 55 is a strobe lamp having a cathode 67 and an anode 69 for energizing the strobe lamp. The lamp 55 further includes a trigger 71 for firing the strobe lamp. The lamp 55 also comprises an elongate illumination glass or quartz tube 73 filled with gas (not shown), such as xenon, for example. On the back 57 of the reflector body 51, there is a capacitor 75 for storing energy for flashing the tube 73. The capacitor 75 is mounted on the base 25 of the housing of the light bar 21 by a bracket 77, as shown in FIG. 10. A number of wires, each indicated 79, interconnects cathode 67, anode 69 and capacitor 75. A similar wire 81 grounds the trigger in conventional fashion. For a more detailed description of this circuit and a control circuit (broadly referred to as "control means") for patterning the discharge of the tube 73 and the other reflector assemblies 27 and light modules 29, reference should be made to co-assigned U.S. Pat. No. 5,189,344, which is incorporated herein by reference. U.S. Pat. No. 5,189,344 also discloses a power supply for supplying the reflector assemblies 27 and light modules 29 with power. Of course, it will be understood that light sources other than a strobe lamp (e.g., an incandescent light) may be used without departing from the scope of the present invention.

Figure 12:
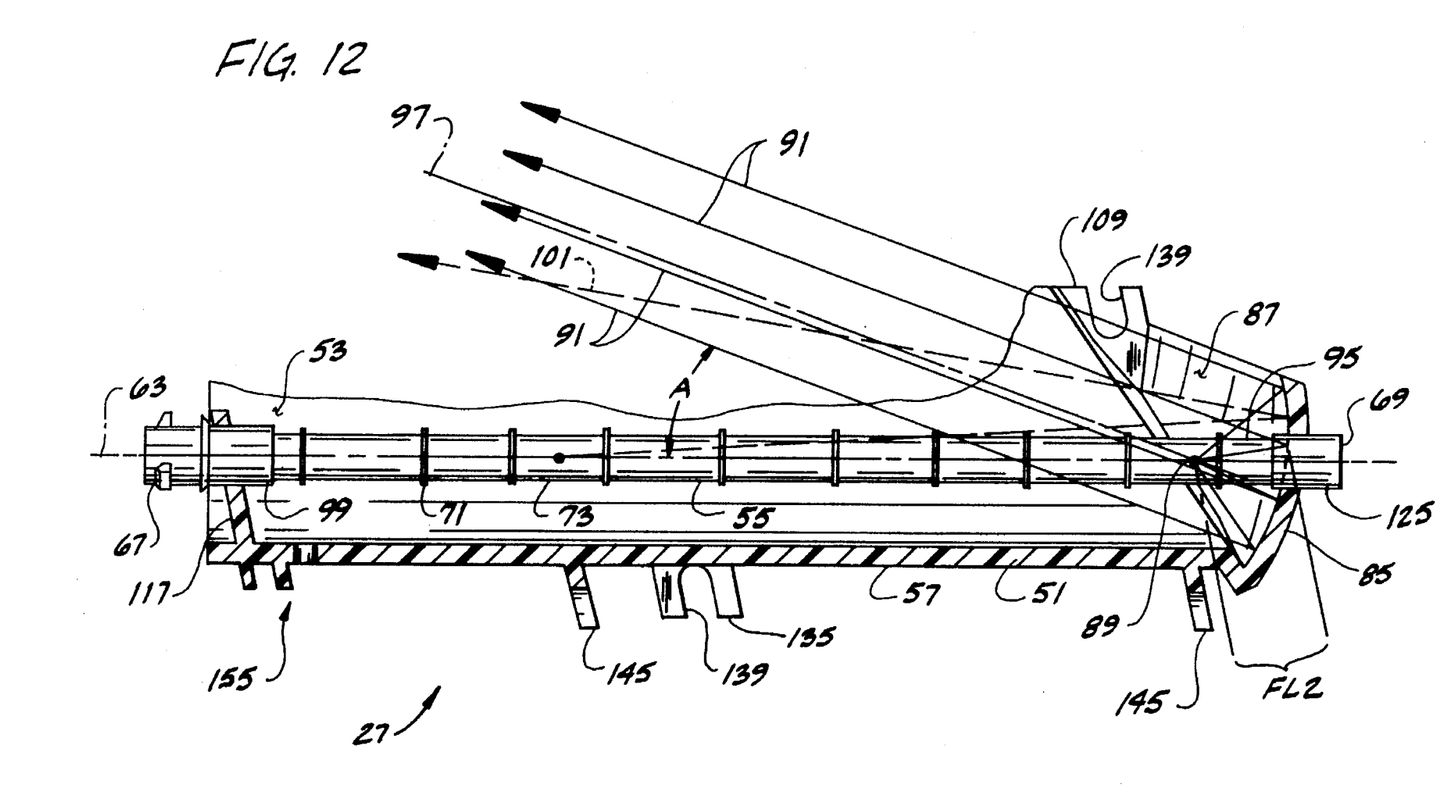
FIG. 12 is an enlarged horizontal section similar to FIG. 5 with parts and portions removed showing light emitted from a lamp reflecting off an end piece of the reflector assembly.

The first (right in FIG. 2) end 59 of the reflector body 51 is closed by an end piece 85 also having a concave reflective surface 87 facing generally toward the second (left) end 61 of the reflector body for reflecting light generally toward the second end. As shown in FIG. 12, the concave reflective surface 87 of the end piece 85 is paraboloidic (i.e., a parabola in three dimensions) having a focal length FL2 (e.g., 0.6 inches) and a focal point 89 located along the axis 63 of the reflective surface 53 (and longitudinal axis of lamp 55) near the right end portion 95 of the lamp. The end piece 85 is integral (i.e., formed as one piece) with the reflector body 51 and is disposed such that light emitted from the lamp 55 at the end piece focal point 89 reflects off surface 87 at an angle A relative to the horizontal axis 63. End 61 of the reflector body 51 is stiffened by a rearwardly extending flange 93 and is open so that some of the light reflected off the reflective surface 87 of the end piece 85 is directed generally toward and through the open second end.

In accordance with this invention, the paraboloidic surface 87 of the end piece 85 functions to more sharply focus and intensify the light compared to a flat reflective surface, for example. More specifically, light emitted from a source at an angle with respect to a flat surface would reflect the light at an equal angle (i.e., the angle of incidence of light directed to a flat mirror is equal to its angle of reflection). The light reflected from such a flat surface is diffused and unfocused, and would not be suitable for reflecting light emitted from lamp 55 as a more focused, intense beam in a direction generally towards the open end 61 of the reflector body 51 (e.g., at an angle A relative to axis 63).

As illustrated in FIG. 12 and mentioned above, light emitted by the lamp 55 at its focal point 89 is reflected off the mirrored surface 87 and directed as a relatively concentrated beam at an angle A relative to the axis 63. This light is indicated by the solid arrow lines designated 91. In addition, light which is emitted by the portion of the lamp 55 between the focal point 89 and its left (as viewed in FIG. 12) end 99 and reflected off the paraboloidic surface 87 of the end piece 85 is directed so that it initially converges inwardly toward an axis 97 normal to the vertex of the surface 87 (i.e., an axis through the focal point 89 and the vertex of the surface) before diverging, as represented by the broken arrow line 101. This light emitted by the portion of the lamp between the focal point 89 and its left end 99 further increases the intensity of light reflected off the paraboloidic reflective surface 87 as viewed from the left (in FIG. 12) of the reflector assembly 27.

In the preferred embodiment, the angle A of reflection is selected so that the concentrated light represented by the arrow lines 91 is directed generally sideways relative to the vehicle on which the light bar 21 is mounted to provide a high-intensity light which is readily visible to a person situated to one side (the left side as viewed in FIG. 12) of the light bar. In the present embodiment this angle A is about 20°. Thus, since each reflector assembly 27 is mounted at an angle of approximately 20° with respect to the longitudinal axis 33 of the light bar 21, light emitted by the lamp 55 at the focal point 89 of the end piece 85 is reflected by the end piece generally parallel to the longitudinal axis 33 of the light bar (i.e., laterally away from the vehicle). This reflected light is highly visible to a person viewing the light bar end-on (which generally corresponds to one of the aforementioned "blind spots" of prior light bars). This configuration allows the light bar 21 to direct intense light not only to the front and rear of the emergency vehicle, but also to the sides of the vehicle (i.e., modules 29 direct light generally forward and rearward of the vehicle and reflector assemblies 27 direct light generally forwardly, rearwardly and to the sides of the vehicle), thereby substantially eliminating "blind spots" which occur with prior art light bars.

It will be understood that the orientation of the reflective surface 87 of the end piece 85 (as shown, it generally faces the second (left) end 61 of the reflective body 51) can be varied to direct the more focused and intense light in the desired direction. For example, the angle A of reflection may range from 0° to 30°. As noted previously, it is preferred that this angle be selected so that the light represented by solid arrow lines 91 in FIG. 12 be directed generally parallel to the longitudinal axis 33 of the light bar 21. Thus, if the reflector assembly 27 is mounted with its axis 63 at a 20° angle relative to the longitudinal axis 33 of the light bar 21, as shown in FIG. 1, angle A may be selected to be 20° so that a focused beam of light is reflected generally parallel to the longitudinal axis of the light bar. It will also be understood that the light bar 21 may be constructed in other ways than the shown rectangular construction, such as a V-shaped light bar which spans the roof of the vehicle. In such a configuration, the reflector assembly 27 may be positioned within the light bar to direct light reflected from the reflector body 51 in a forward or rearward direction relative to the front or back of the vehicle, respectively, and to direct light reflected from the end piece 85 to the side of the vehicle.

Figure 5:
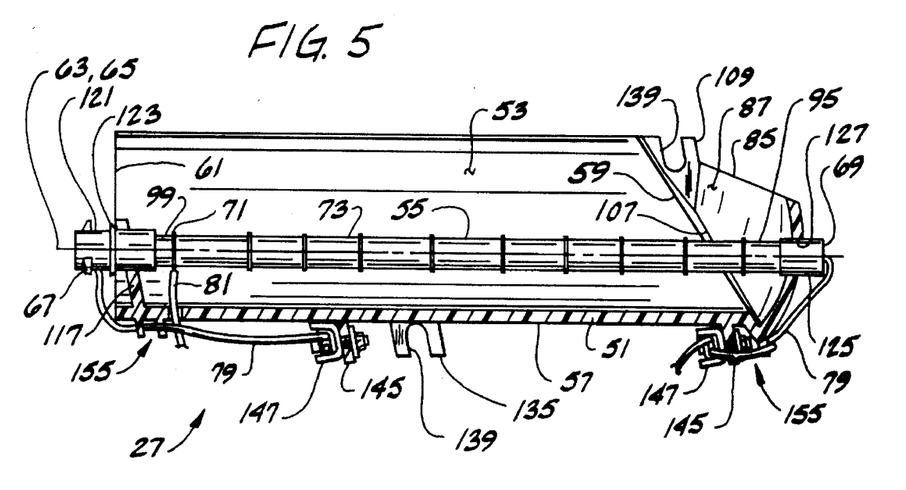
FIG. 5 is a horizontal section taken on line 5—5 of FIG. 2.
Figure 6:
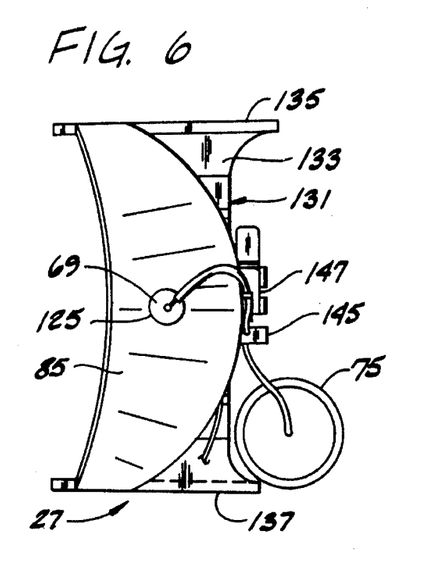
FIG. 6 is a right end view of the reflector assembly shown in FIG. 2.
Figure 7:
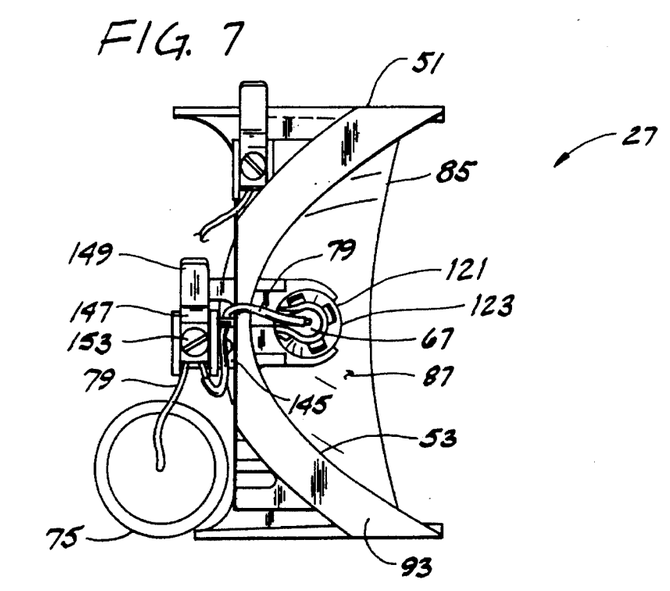
FIG. 7 is a left end view of the reflector assembly shown in FIG. 2.
Figure 8:
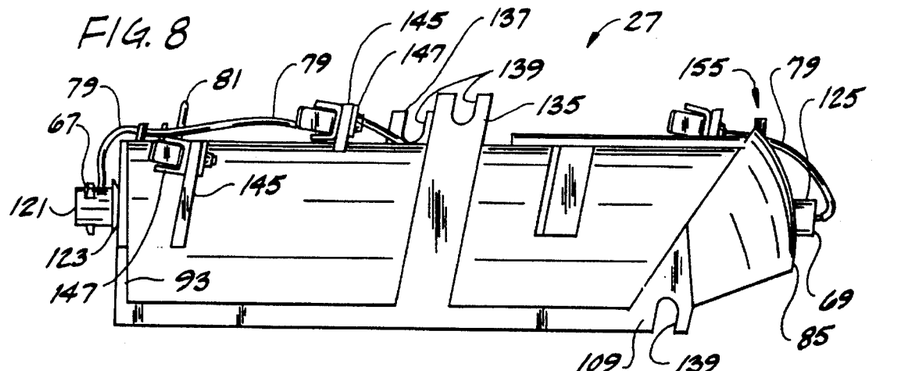
FIG. 8 is a top plan view of the reflector assembly shown in FIG. 2.
Figure 9:
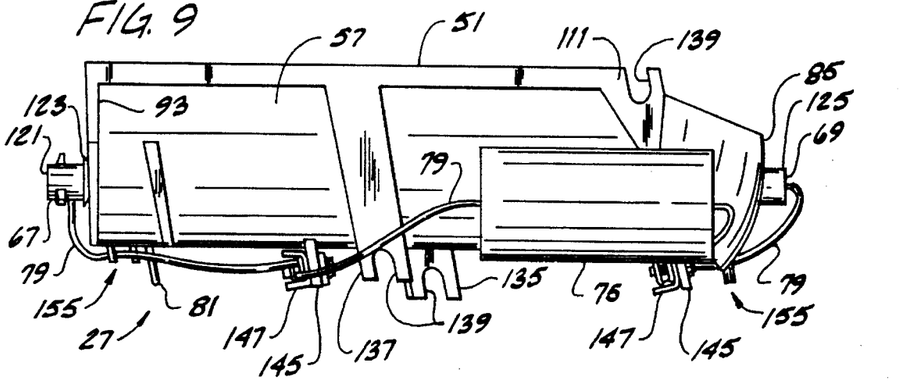
FIG. 9 is a bottom plan view of the reflector assembly shown in FIG. 2.
Figure 11:
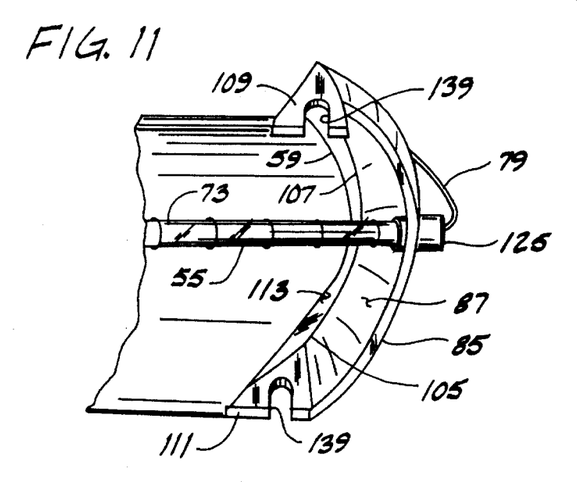
FIG. 11 is an enlarged front perspective of a curved transition interconnecting a reflector body and an end piece of the reflector assembly.

Referring now to FIGS. 5 and 11, a curved transition, indicated at 107, interconnects a rear edge 105 of the end piece 85 to the first end 59 of the reflector body 51. The curved transition 107 is generally parabolic in shape and extends rearwardly and outwardly away from the first end 59 of the reflector body 51 to compensate for the positioning of the end piece 85 which is offset rearwardly with respect to the first end of the reflector body. The shape of the curved transition 107 is dictated by the profile of the parabolic reflector body 51 and the profile of the paraboloidic end piece 85 and by their differing focal points (i.e., the end piece having a larger focal length than the reflector body). The transition 107 includes two horizontally disposed wedge-shaped members 109 and 111, one wedge-shaped member 109 being located at the top of the end piece 85 and the other member 111 being located at the bottom of the end piece. The wedge-shaped members 109, 111 complete the interconnection of the top of the end piece 85 to the top of the reflector body 51 and the bottom of the end piece to the bottom of the reflector body, respectively. The curved transition 107 has a reflective surface 113 (see FIG. 11) interconnecting the front reflective surface 53 of the reflector body 51 and the reflective surface 87 of the end piece 85. It will be understood that the end piece 85 may be interconnected to the reflector body 51 in other ways. For example, the end piece 85 may be positioned forwardly with respect to the reflector body 51, in which case the curved transition 107 would extend forwardly and outwardly to connect them.

In the shown embodiment, the reflector body 51, end piece 85 and curved transition 107 are formed as one-piece from synthetic resin material, such as a high temperature plastic manufactured by General Electric under the trademark "Noryl". This part (i.e., the reflector body 51, end piece 85 and curved transition 107) may be produced by injection molding. The mirrored (front) surfaces of this part, i.e., the reflective surfaces 53, 87 and 113 of the reflector body 51, end piece 85 and curved transition 107, respectively, are coated with an aluminum composite material as is well known in the art.

The lamp 55 is mounted on the reflector body 51 by means comprising an arm 117 projecting forwardly from the reflector body at its open end 61. The arm 117 has a slot 119 extending from its outer end for receiving one end portion 99 of the illumination tube 73. The tube has a gasket 121 of cushioning material, such as rubber, fitted thereon which is received within the slot 119 of the arm 117. The gasket 121 dampens vibration transmitted by the reflector body 51 to the tube 73. A flange 123 on the gasket 121 prevents lateral movement of the tube 73 with respect to its horizontal axis 63. The opposite end portion 95 of the tube 73 is also fitted with a rubber gasket 125. This end portion 95 is fitted in an opening 127 formed in the end piece 85, the arrangement being such that the end of the tube 73 extends outwardly beyond the outer surface of the end piece. This design allows for the easy removal and replacement of the tube 73.

A stabilizing structure, generally indicated at 131, formed as an integral part of the reflector body 51, projects rearwardly from the back 57 of the reflector body 51. Besides stiffening the reflector body 51, this structure 131 also aids in mounting the reflector assembly 27 on the base 25 of the housing. As shown in FIG. 3, the structure 131 includes a wall 133 disposed in a vertical plane, a horizontal flange 135 at the upper end of the vertical wall (see FIG. 8), and a horizontal flange 137 at the lower end of the vertical wall (see FIG. 9). The horizontal flanges 135 and 137 are provided for stably mounting the reflector assembly on the base 25 in an operative position with one of the flanges 135, 137 engaging the base (i.e., the reflector assembly 27 is designed to be selectively mounted with either long side of the reflector body adjacent the base of the light bar). Each horizontal flange 135, 137 has a slot 139 which extends inwardly (forwardly) from its outer (rearward) end. Similar slots 139 are formed in the wedge-shaped members 109 and 111 (see FIG. 10). As illustrated in FIGS. 2 and 3, a pair of nut and bolt fastener assemblies (each assembly being designated 141) are received in the slot 139 of the horizontal flange 137 and in the slot 139 of the wedge-shaped member 111 for releasably securing the reflector assembly 27 to the base 25. By flipping the reflector assembly over, slots 139 in the horizontal flange 135 and member 109 may be used to mount the assembly. Openings 143 are pre-formed in the base 25 of the housing for receiving the nut and bolt assemblies 141 and for securing the reflector assemblies 27 thereto. Another way of securing the reflector assembly 27 to the light bar 21 is to capture the wedge-shaped members 109, 111 with the lens.

Referring now to FIG. 3, a number of tabs (broadly referred to as "tab means"), each designated 145, project rearwardly from the back 57 of the reflector body 51. Each tab 145 has two notches extending inwardly from its outer end for receiving a connector clip 147 associated with wires 79 and 81. As shown, there are four such tabs 145a-d provided on the back 57 of the reflector body 51. As illustrated in FIG. 3, the two tabs 145a, 145b on the right side of the reflector body 51 are provided for receiving a clip 147 associated with the trigger wiring 81. Tab 145c is provided for receiving an identical clip 147 connecting wiring 79 associated with the cathode 67 to the capacitor 75. Tab 145d is provided for receiving a clip 147 connecting wiring 79 associated with the anode 69 to the capacitor 75.

Each clip 147 comprises a U-shaped piece 149 which is adapted to fit within one of the notches of a respective tab 145. The legs of the U-shaped piece 149 have aligned openings adapted to receive a screw 151 for tightening the clip to the tab in a position in which the screw is received in the other notch of the tab, as best illustrated in FIG. 3. More specifically, one of the openings is threaded so that when the screw 151 is tightened, the legs of the U-shaped piece 149 clamp against the tab 145 to releasably secure the clip 147 in fixed position. The clip 147 also includes a terminal 153 for electrically connecting the reflector assembly 27 to wiring associated with the circuitry of the light bar (not shown). A small metal lock washer (not shown) having an opening for receiving the shank of the screw 151 may also be provided for applying a uniform clamping force on the wiring 79 or 81 positioned between the head of the screw and terminal 153.

Two pairs of posts, each pair being generally indicated at 155, are also provided on the back 57 of the reflector body 51. The two posts 155 of each pair are closely spaced (e.g., the space between the posts is only slightly greater than the width of the wiring 79) to stabilize the wiring 79 connecting the cathode 67 and anode 69 to their respective clips 147. Each pair of posts 155 projects rearwardly with respect to the reflector body 51. As illustrated in FIG. 3, one pair of posts 155 (i.e., the posts on the right side of the reflector body 51) is provided for stabilizing the wiring 79 connecting the cathode 67 to its respective clip 147 in the manner shown, and the other pair of posts 155 (i.e., the posts on the left side of the reflector body) is provided for stabilizing the wiring 79 connecting the anode 69 to its respective clip 147. For each pair of posts 155, the wiring 79 is adapted to be bent so that it is positioned in the space between the posts. Thus, the bent wiring is flexed so that it engages both posts, thereby being captured by them.

It will be observed from the foregoing that the reflector assembly 27 of the present invention has several important advantages. As best illustrated in FIG. 1, the light bar 21 is provided with four reflector assemblies 27. These reflector assemblies 27 are constructed and arranged to emit intense and focused light not only forward and rearward relative to the emergency vehicle on which they are mounted but also to the sides of the vehicle, thereby substantially eliminating "blind spots" found in prior light bars without the necessity of adding additional reflector assemblies. Also, the tabs 145 provided on the back 57 of the reflector body 51 of each assembly 27 enable the end user consumer of the light bar 21 to easily disassemble the components of the reflector assembly 27 and replace worn-out parts, such as the capacitor 75 and the illumination tube 73. By simply unscrewing the screw of the clip 147 and separating the necessary wiring, the component parts of the reflector assembly 27 may be disassembled.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a light bar having an axis, said light bar being adapted to be mounted on a vehicle with its axis extending generally in side-to-side direction with respect to the vehicle, said light bar comprising at least one light reflector assembly, characterized in that said reflector assembly comprises:

a reflector body having a front reflective surface, a back, and first and second opposite ends, a lamp mounted on the reflector body forward of said reflective surface, said front reflective surface being concave with respect to an axis disposed forward of said reflective surface and extending in end-to-end direction relative to said reflector body, said reflective surface being adapted to reflect light emitted by said lamp in a generally forward direction generally perpendicular to said axis of the front reflective surface, and an end piece at said first end of the reflector body, said end piece having a concave reflective surface facing generally toward said second end of said body for reflecting light emitted by said lamp in a direction generally transverse to the light reflected by said front reflective surface so as to be readily visible by a person standing to one side of the vehicle, said concave reflective surface of the end piece having a focal point located along said axis of the front reflective surface.

2. A light bar as set forth in claim 1 wherein at least one reflector assembly is mounted in a position where light reflected off said front reflective surface of the reflector body is adapted to be directed generally forward with respect to the vehicle, and where light reflected off the reflective surface of the end piece is adapted to be directed generally toward a side of the vehicle.

3. A light bar as set forth in claim 2 wherein a portion of the light reflected off the reflective surface of the end piece is directed as a relatively concentrated beam generally parallel to said axis of the light bar.

4. A light bar as set forth in claim 1 wherein at least one reflector assembly is mounted in a position where light reflected off said front reflective surface of the reflector body is adapted to be directed generally rearward with respect to the vehicle, and where light reflected off the reflective surface of the end piece is adapted to be directed generally toward a side of the vehicle.

5. A light bar as set forth in claim 4 wherein a portion of the light reflected off the reflective surface of the end piece is directed as a relatively concentrated beam generally parallel to said axis of the light bar.

6. A light bar as set forth in claim 1 wherein said concave reflective surface of the end piece has a vertex, said focal point lying on said axis of the front reflective surface, and wherein a line passing through said vertex and said focal point extends at an angle in the range of 0°–30° relative to said axis.

7. A light bar as set forth in claim 6 wherein said line passing through said vertex and said focal point extends at an angle of approximately 20° relative to said axis of the front reflective surface.

8. A light bar as set forth in claim 1 wherein the reflective surface of said end piece is generally parabolic.

9. A light bar as set forth in claim 8 wherein the reflective surface of the end piece is generally paraboloidic.

10. A light bar as set forth in claim 8 wherein the reflective surface of the end piece is arranged along a parabolic curve.

11. A light bar as set forth in claim 8 wherein said front reflective surface of the reflector body is generally parabolic.

12. A light bar as set forth in claim 11 wherein said front reflective surface of the reflector body has a focal line coaxial with said axis of the front reflective surface.

13. A light bar as set forth in claim 12 wherein said lamp comprises an elongate illumination tube disposed along said axis of the front reflective surface, the tube having one of its ends mounted by mounting means associated with the reflector body and its other end mounted by mounting means associated with the end piece.

14. A light bar as set forth in claim 12 wherein the reflective surface of the end piece has a focal length greater than the focal length of the front reflective surface of the reflector body.

15. A light bar as set forth in claim 14 wherein the reflective surface of the end piece has a focal length of approximately 0.6 inches and the front reflective surface of the reflector body has a focal length of approximately 0.4 inches.

16. A light bar as set forth in claim 14 further comprising a curved transition interconnecting the first end of the reflector body and a rearward edge of the end piece.

17. A light bar as set forth in claim 16 wherein said curved transition is generally parabolic.

18. A light bar as set forth in claim 16 wherein said rearward edge of the end piece is offset rearwardly with respect to the first end of said reflector body.

19. A light bar as set forth in claim 16 wherein said curved transition has a reflective surface interconnecting said front reflective surface of the reflector body and said concave reflective surface of the end piece.

20. A light bar as set forth in claim 16 wherein said curved transition includes at least one slot for receiving a fastener to mount the reflector assembly on a mounting surface of the light bar.

21. A light bar as set forth in claim 1 wherein said second end of the body is open so that some of the light reflected off the reflective surface of the end piece is directed generally toward and through said open second end.

22. A light bar as set forth in claim 1 wherein said lamp comprises an elongate illumination tube disposed along said axis of the front reflective surface, the tube having one of its ends mounted on mounting means associated with the reflector body and its other end mounted on mounting means associated with the end piece.

23. A light bar as set forth in claim 22 wherein said mounting means associated with the end piece comprises a gasket of cushioning material on the end of the tube, said end of the tube being received within an opening formed in the end piece and extending outwardly beyond an outer surface of the end piece.

24. A light bar as set forth in claim 1 wherein said lamp comprises a strobe lamp having an anode and a cathode for energizing the strobe lamp, and a trigger for firing the strobe lamp.

25. A light bar as set forth in claim 24 further comprising tab means mounted on the back of said reflector body for releasably securing wiring connecting the anode, cathode and trigger of the lamp.

26. A light bar as set forth in claim 25 wherein said tab means comprises a plurality of tabs projecting rearwardly from the back of the reflector body, each tab having one or more notches formed therein for receiving one or more connectors associated with said wiring for releasably holding said wiring connecting the anode, cathode and trigger of the lamp.

27. A light bar as set forth in claim 25 further comprising at least one pair of closely spaced-apart posts on the back of the reflector body for receiving said wiring therebetween connecting the anode, cathode and trigger of the lamp therebetween, said posts being adapted to stabilize said wiring.

28. A light reflector assembly comprising a reflector body having a front reflective surface, a back, and first and second opposite ends, a lamp mounted on the reflector body forward of said reflective surface, said front reflective surface being concave with respect to an axis disposed forward of said reflective surface and extending in end-to-end direction relative to said reflector body, said reflective surface being adapted to reflect light emitted by said lamp in a generally forward direction generally perpendicular to said axis of the front reflective surface, and an end piece at said first end of the reflector body, said end piece having a concave reflective surface facing generally toward said second end of said body for reflecting light emitted by said lamp in a direction generally transverse to the light reflected by said front reflective surface, said concave reflective surface of the end piece having a vertex and a focal point, and wherein a line passing through said vertex and said focal point extends at an angle in the range of 0°–30° relative to said axis, said second end of the reflector body being open so that some of the light reflected off the reflective surface of the end piece is directed generally toward and through said open second end.

29. A light reflector assembly as set forth in claim 28 wherein said focal point lies on said axis of the front reflective surface.

30. A light reflector assembly as set forth in claim 29 wherein said line passing through said vertex and said focal point extends at an angle of approximately 20° relative to said axis of the front reflective surface.

31. A light reflector assembly as set forth in claim 28 wherein the reflective surface of said end piece is generally parabolic.

32. A light reflector assembly as set forth in claim 31 wherein the reflective surface of the end piece is generally paraboloidic.

33. A light reflector assembly as set forth in claim 31 wherein the reflective surface of the end piece is arranged along a parabolic curve having a focal point located along said axis of the front reflective surface.

34. A light reflector assembly as set forth in claim 31 wherein said front reflective surface of the reflector body is generally parabolic.

35. A light reflector assembly as set forth in claim 34 wherein said front reflective surface of the reflector body has a focal line coaxial with said axis of the front reflective surface and wherein the focal point of said reflective surface of the end piece is located along said axis of the front reflective surface.

36. A light reflector assembly as set forth in claim 35 wherein said lamp comprises an elongate illumination tube disposed along said axis of the front reflective surface, the tube having one of its ends mounted by mounting means associated with the reflector body and its other end mounted by mounting means associated with the end piece.

37. A light reflector assembly as set forth in claim 35 wherein the reflective surface of the end piece has a focal length greater than the focal length of the front reflective surface of the reflector body.

38. A light reflector assembly as set forth in claim 37 wherein the reflective surface of the end piece has a focal length of approximately 0.6 inches and the front reflective surface of the reflector body has a focal length of approximately 0.4 inches.

39. A light reflector assembly as set forth in claim 37 further comprising a curved transition interconnecting the first end of the reflector body and a rearward edge of the end piece.

40. A light reflector assembly as set forth in claim 39 wherein said curved transition is generally parabolic.

41. A light reflector assembly as set forth in claim 39 wherein said rearward edge of the end piece is offset rearwardly with respect to the first end of said reflector body.

42. A light reflector assembly as set forth in claim 39 wherein said curved transition has a reflective surface interconnecting said front reflective surface of the reflector body and said concave reflective surface of the end piece.

43. A light reflector assembly as set forth in claim 39 wherein said curved transition includes at least one slot for receiving a fastener to mount the reflector assembly on a mounting surface.

44. A light reflector assembly as set forth in claim 28 wherein said lamp comprises an elongate illumination tube disposed along said axis of the front reflective surface, the tube having one of its ends mounted on mounting means associated with the reflector body and its other end mounted on mounting means associated with the end piece.

45. A light reflector assembly as set forth in claim 44 wherein said mounting means associated with the end piece comprises a gasket of cushioning material on the end of the tube, said end of the tube being received within an opening formed in the end piece and extending outwardly beyond an outer surface of the end piece.

46. A light reflector assembly as set forth in claim 28 wherein said lamp comprises a strobe lamp having an anode and a cathode for energizing the strobe lamp, and a trigger for firing the strobe lamp.

47. A light reflector assembly as set forth in claim 46 further comprising tab means mounted on the back of said reflector body for releasably securing wiring connecting the anode, cathode and trigger of the lamp.

48. A light reflector assembly as set forth in claim 47 wherein said tab means comprises a plurality of tabs projecting rearwardly from the back of the reflector body, each tab having one or more notches formed therein for receiving one or more connectors associated with said wiring for releasably holding said wiring connecting the anode, cathode and trigger of the lamp.

49. A light reflector assembly as set forth in claim 46 further comprising at least one pair of closely spaced-apart posts on the back of the reflector body for receiving said wiring therebetween connecting the anode, cathode and trigger of the lamp therebetween, said posts being adapted to stabilize said wiring.

50. A light reflector assembly comprising a reflector body having a front reflective surface, a back, and first and second opposite ends, a strobe lamp having an anode and a cathode for energizing the strobe lamp, and a trigger for firing the strobe lamp, said strobe lamp mounted on the reflector body forward of said reflective surface, tab means mounted on the back of said reflector body for releasably securing wiring connecting the anode, cathode and trigger of the lamp, said front reflective surface being concave with respect to an axis disposed forward of said reflective surface and extending in end-to-end direction relative to said reflector body, said reflective surface being adapted to reflect light emitted by said lamp in a generally forward direction generally perpendicular to said axis of the front reflective surface, and an end piece at said first end of the reflector body, said end piece having a concave reflective surface facing generally toward said second end of said body for reflecting light emitted by said lamp in a direction generally transverse to the light reflected by said front reflective surface, said second end of the reflector body being open so that some of the light reflected off the reflective surface of the end piece is directed generally toward and through said open second end.

* * * * *